W. B. TURNER.
LEATHER GLAZING MACHINE.
APPLICATION FILED APR. 4, 1910.

982,398.

Patented Jan. 24, 1911.
7 SHEETS—SHEET 1.

W. B. TURNER.
LEATHER GLAZING MACHINE.
APPLICATION FILED APR. 4, 1910.

982,398.

Patented Jan. 24, 1911.

W. B. TURNER.
LEATHER GLAZING MACHINE.
APPLICATION FILED APR. 4, 1910.

982,398.

Patented Jan. 24, 1911.

UNITED STATES PATENT OFFICE.

WILLIAM B. TURNER, OF MELROSE, MASSACHUSETTS, ASSIGNOR TO LEATHER FINISHING MACHINE COMPANY, OF BOSTON, MASSACHUSETTS, A CORPORATION OF WEST VIRGINIA.

LEATHER-GLAZING MACHINE.

982,398.  Specification of Letters Patent.  Patented Jan. 24, 1911.

Application filed April 4, 1910. Serial No. 553,310.

*To all whom it may concern:*

Be it known that I, WILLIAM B. TURNER, of Melrose, in the county of Middlesex and State of Massachusetts, have invented certain new and useful Improvements in Leather-Glazing Machines, of which the following is a specification.

This invention relates to leather finishing machines which are known as "glazing machines", by which the surface of the leather is smoothed, stretched, and polished.

In the operation of a glazing machine the leather is laid upon a bed or support, and one or more working tools commonly termed agates or glasses are moved over the surface of the leather so as to glaze the surface and remove the wrinkles and unevenness of the leather. The action of the glasses crowds the surface of the leather and often produces small folds or creases which are pressed into the leather by the pressure of the glasses. Thus the glasses, although efficient for polishing mar the quality of the leather by producing the folds or creases above noted. For this reason it is necessary to restrict the size of the glasses so that only a relatively small area of the leather is engaged by the glasses for each stroke. This limits the output of the machine in addition to impairing the quality of the work.

The present invention overcomes the production of folds or creases due to the action of the glasses.

In carrying out the invention a glazing machine is equipped with means for spreading and stretching the leather and maintaining a tension during the action of the glasses so that creases or folds will not be produced by the action of the glasses. Requisite tension is maintained by traveling blades which precede the glasses, and act upon both sides of the leather to reduce it to a flat state in advance of the glasses. As a result of providing a device which maintains a tension in advance of the glasses the tendency of the leather to become folded or creased by the glasses is obviated.

The preliminary work engaging device comprises blades which are set at an angle to each other and at an angle to their movement, and which not only exert a longitudinal tension but also exert a lateral tension due to the angularity of the blades. Another advantage of providing a preliminary device of this kind is that the width of the area which may be successfully glazed at one stroke of the glasses may be increased, and consequently the leather may be glazed with fewer strokes of the glasses and the quantity of work produced is correspondingly increased.

The glazing machine illustrated upon the accompanying drawings is somewhat similar to that forming the subject matter of my co-pending application filed May 15, 1908, Serial No. 433,051. The glasses included in the present invention, and in said co-pending application are supported by links so arranged that the reciprocating movement of the glasses is rectilinear. The bed or support upon which the work is laid is movable toward and from the plane in which the glasses move, and is actuated by automatic mechanism so that it is maintained in operative position during the working stroke of the glasses and is retracted from operative position during the return stroke of the glasses.

Referring now to the accompanying drawings which illustrate a glazing machine embodying the present invention in one form.

The same reference characters indicate the same parts wherever they occur.

The several mechanisms hereinafter described are mounted in a frame comprising side members 25 and 26. The bed or work support is mounted upon a movable frame 27 and the glasses which are indicated at 28 are mounted in a reciprocatory frame or carrier 29. The carrier 29 is suspended at the lower ends of pivot links 30, 30 by which it is given a rectilinear reciprocating movement from front to rear in a horizontal plane. The upper ends of the links 30 are pivotally connected to vertically movable tie-rods or bars 31. The bars 31 are guided by vertical faces 32 at the upper portions of the frame members 25 and 26, and the bars 31 are provided with projecting members such as rolls 33 which coact with the guiding faces 32. The links 30 between their ends are pivotally connected to the upper ends of links 34 whose lower ends are mounted upon pivot studs 35 supported by the frame members 25 and 26. The arrangement and proportions of the links 30 and 34 are such as to effect the aforesaid rectilinear movement of the carrier 29 when the latter is reciprocated.

Figure 2:
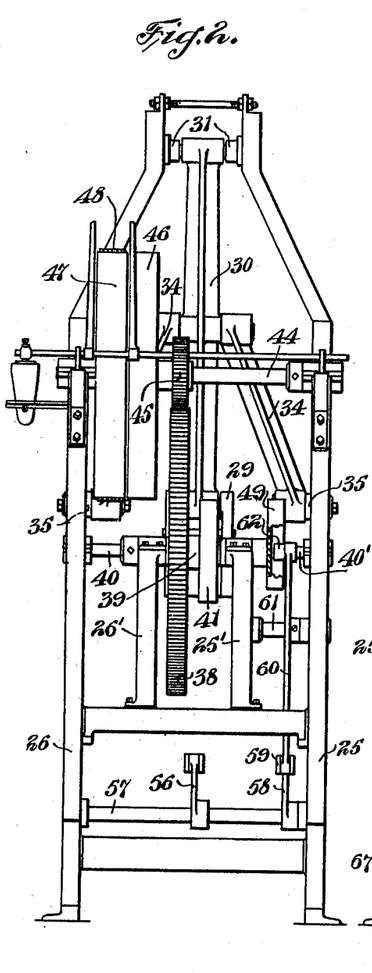
Fig. 2 represents a rear elevation of the machine illustrated by Fig. 1.

Reciprocating movement is imparted to the carrier 29 by a connecting rod 36 and crank pin 37. The crank pin is here shown as connecting a gear 38 and a crank arm 39, said gear and arm being affixed respectively to shaft sections 40 and 40' mounted in bearings in the frame members 25 and 26. Brackets 25' and 26' are provided for affording bearings for the inner ends of the shaft sections 40 and 40' (see Fig. 2). The opposite end of the crank arm 39 is provided with a radially adjustable counter-weight 41. The counter-weight is provided with a slot 42 through which a clamping bolt 43 extends to clamp the counter-weight at any desired position with relation to the crank arm. The counter-weight may thus be adjusted radially and may be positioned so as to compensate for the weight and momentum of the connecting rod 36. A prime power shaft is indicated at 44 and is provided with a pinion 45 engaging the gear 38. The shaft 44 is further provided with tight and loose pulleys 46 and 47 for engagement by a belt 48.

Figure 1:
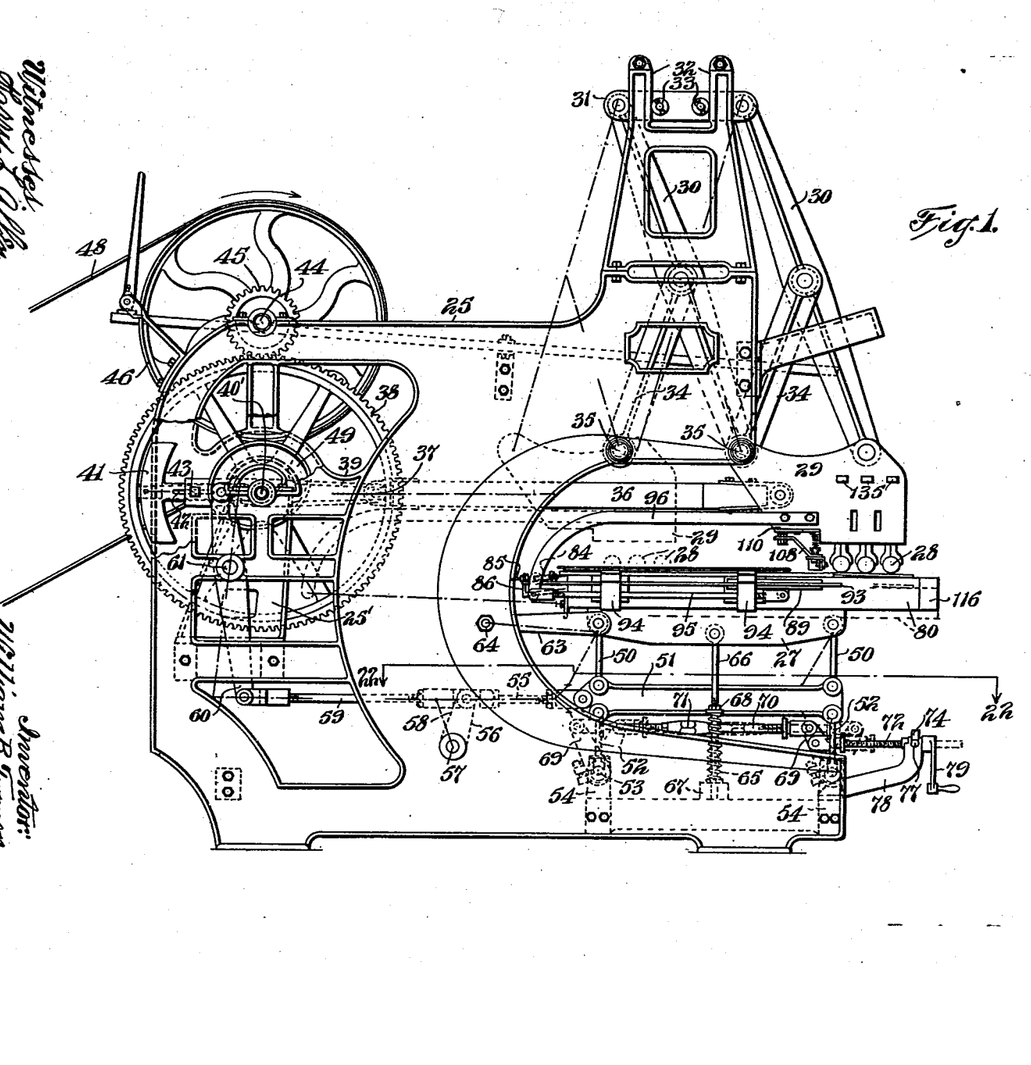
Figure 1 represents a side elevation.

As shown by Fig. 1 the forward position of the carrier 29 is indicated by solid lines and the rearward position is indicated by dotted lines. The angles of the links 30 and 34 when the carrier is in its rearward position are also indicated by dotted lines in Fig. 1. The work support as shown by Fig. 1 is elevated to operative position, where it remains during the rearward movement of the carrier 29. At the completion of the rearward movement of the carrier the work support is depressed and it remains in its lower position while the carrier 29 moves forward. When the carrier once again reaches its forward position the work support is again elevated to the position shown.

Figure 3:
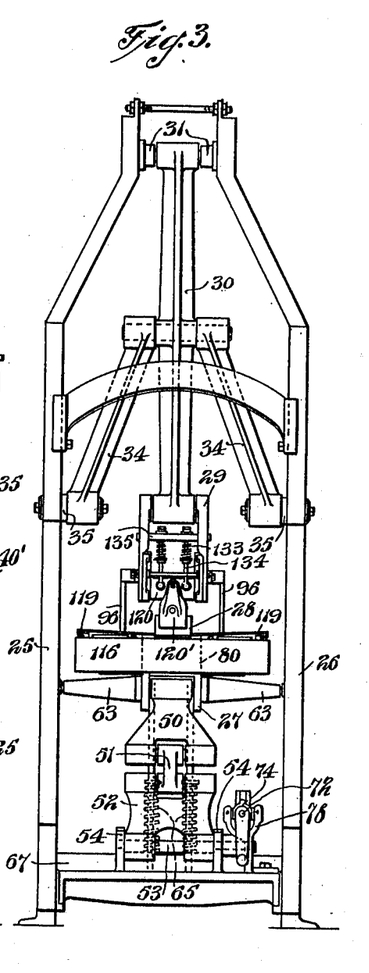
Fig. 3 represents a front elevation thereof.

The mechanism for actuating the work support is controlled by a cam 49 affixed upon the shaft 40'. The frame 27 for the work support is mounted upon toggle links 50 which extend upwardly from a beam 51. The beam is mounted upon toggle links 52 which extend downwardly to eccentric pivot shafts 53. The ends of the pivot shafts 53 are mounted in brackets 54 as shown by Fig. 3. The intermediate portions of the shafts 53 between the brackets 54 are eccentric with relation to the portions which bear in the brackets, the purpose being to enable adjustment of the shafts 53 so that the eccentricity of the intermediate portions may serve to adjust the height of the work support in the manner hereinafter explained.

Figures 17, 18, 19, 20, 21, 22:
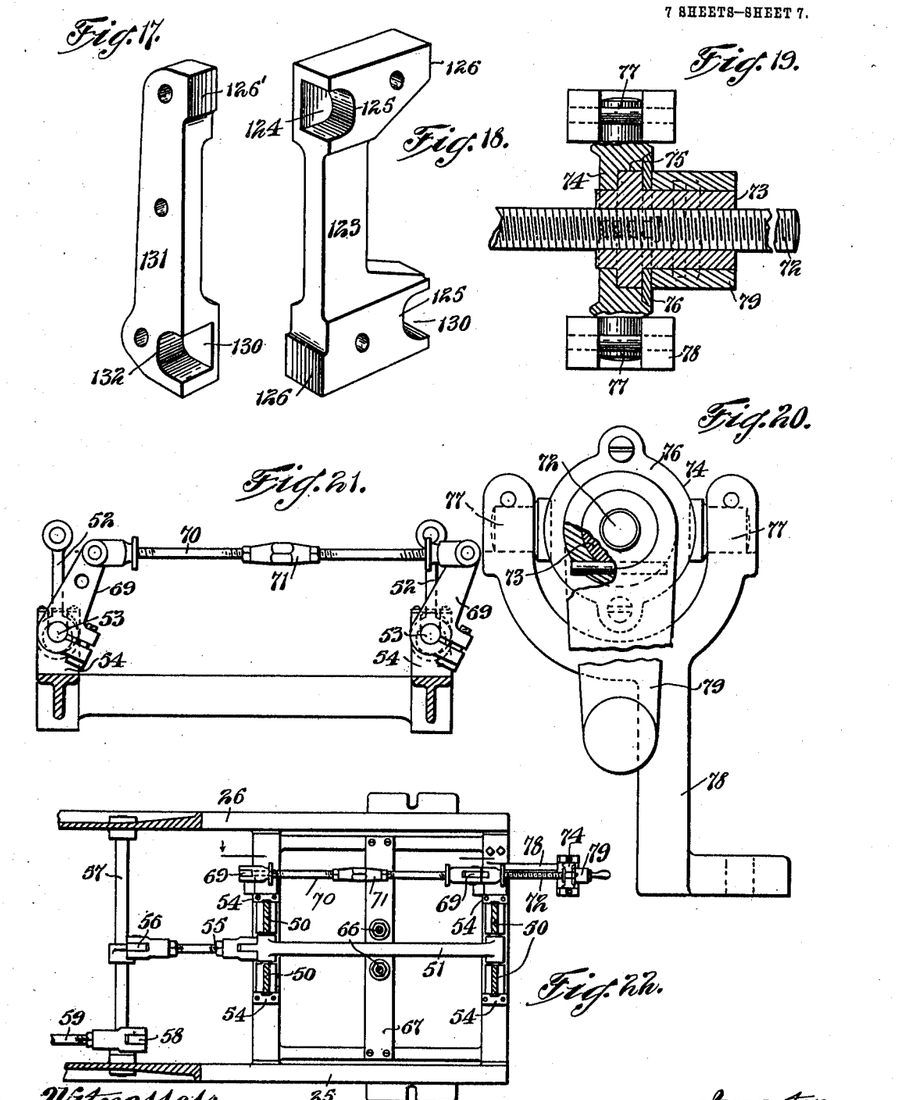
Fig. 17 represents in perspective one of two complemental members for supporting one of the glasses.
Fig. 18 represents in perspective another of said complemental members for supporting the glasses.
Fig. 19 is a horizontal section of a device for effecting adjustment of the work support.
Fig. 20 is a front elevation, partly in section, of the adjusting mechanism shown by Fig. 19.
Fig. 21 represents a vertical section of a portion of the mechanism by which the work support is actuated and supported.
Fig. 22 represents a horizontal section on line 22—22 of Fig. 1 of the mechanism by which the work support is actuated and supported.

One end of the beam 51 is pivotally connected to a link 55. The link 55 is pivotally connected to an arm 56 affixed upon a rock-shaft 57 (see Fig. 22). The rock-shaft is mounted in the frame members 25 and 26 and is provided with a second arm 58. The arm 58 is connected by a link 59 with a cam lever 60. The lever 60 is mounted upon a pivot 61 and is provided with a cam roll 62 (see Fig. 2) which engages the cam 49. Horizontal movement of the frame 27 is prevented by a link 63 mounted upon a pivot stud 64 in the frame 25 and pivotally connected to the frame 27. If desired the weight of the frame 27 may be balanced by springs 65. As here shown a pair of rods or plungers 66 pivotally connected to the frame 27 extend downwardly to bearings 67 at the base of the frame. The plungers are provided with nuts or other abutments 68 which bear upon the upper ends of the springs 65 coiled about the lower ends of the plungers.

The mechanism for effecting adjustment of the work support by means of the eccentric shafts 53 is illustrated by Figs. 19 to 22 inclusive. At one end of each of the eccentric shafts 53 is an arm 69 (see Fig. 21). The arms are preferably split and provided with clamping bolts so that they may be positioned relatively to the shafts 53, and clamped upon the shafts. The free ends of the arms 69 are connected by a link 70, including a turn buckle 71 by which one of the arms may be adjusted with relation to the other to adjust one end of the bed independently. One of the arms 69 (see Figs. 1 and 22) is pivotally connected to a screw threaded rod 72. The rod extends through a nut 73 (see Fig. 19) said nut being rotatively mounted in a swiveled hanger 74. The nut is provided with a flange 75 which is confined in the hanger 74 by a plate 76. Overlapping of the hanger 74 and plate 76 merely prevents longitudinal movement of the nut, but permits free rotation thereof. The hanger 74 is provided with trunnions 77 which are mounted in a yoke or bracket 78. The nut 73 may be provided with a crank 79 or other device whereby it may be rotated to effect longitudinal movement of the rod 72. The effect of moving the rod 72 is to turn the eccentric shafts 53 on their axes and thus vary the vertical adjustment of the frame 27 irrespective of the rise and fall of the frame due to the action of the cam 49.

Figure 4:
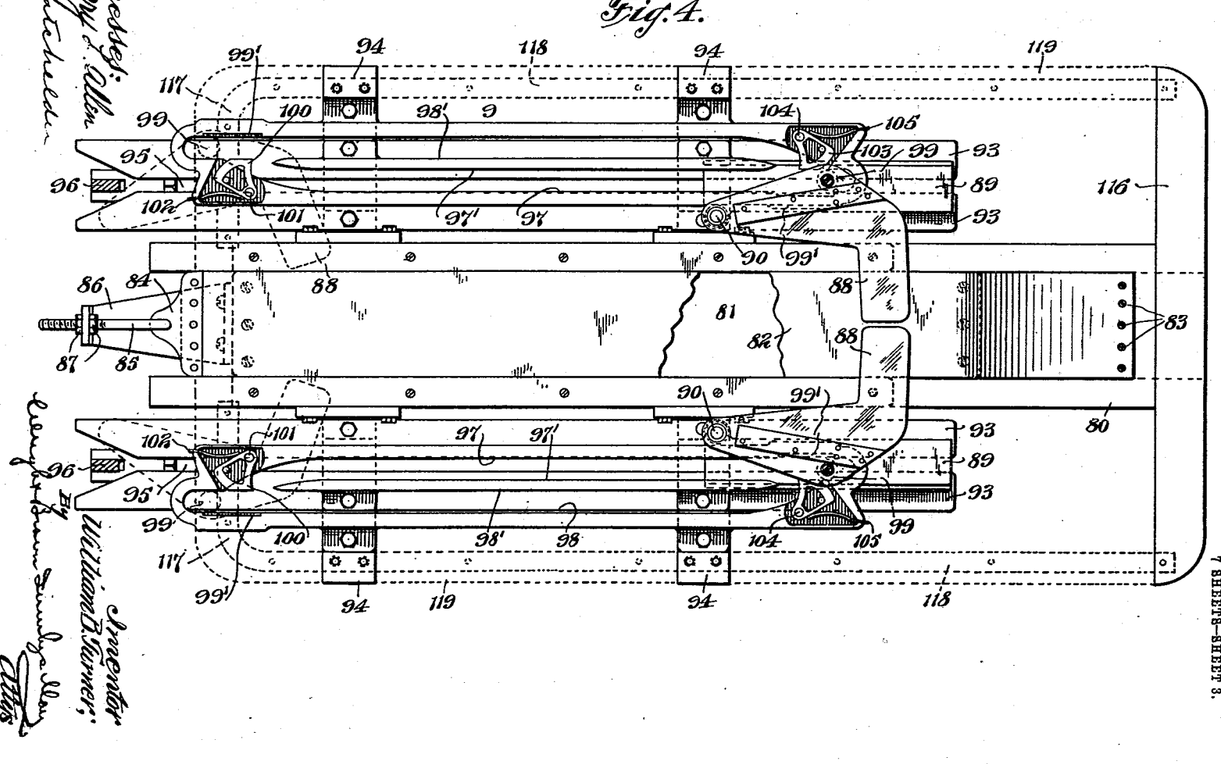
Fig. 4 represents a plan view of mechanism associated with the work support.
Figure 5:
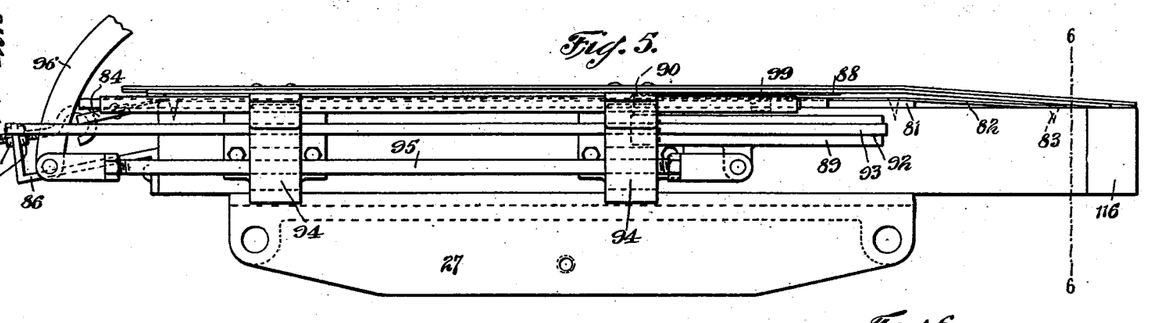
Fig. 5 represents a side elevation of the work support and the mechanism associated therewith.
Figures 6, 7, 8:
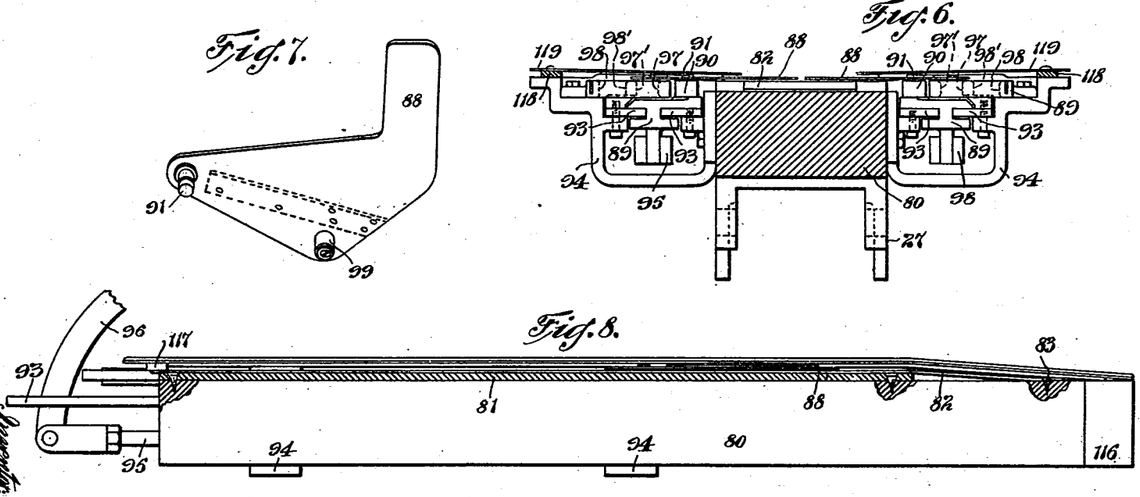
Fig. 6 represents a vertical cross section on line 6—6 of Fig. 5.
Fig. 7 represents a perspective view of a blade which engages the work in advance of the glasses.
Fig. 8 represents a side elevation, partly in section, of a part of the work support.

As shown by Figs. 5 and 6 the frame 27 supports a bed or beam 80, which extends from front to rear. The bed 80, may, if desired, be composed of wood, and if so it is desirable to provide a protective strip 81 of steel or other material upon the upper surface of the bed. A strip 82 of friction material such as leather is laid upon the strip 81 and fastened tightly thereon in any suitable manner. As here shown the forward end of the strip 82 is attached to the bed 80 by a plurality of screws 83 (see Figs. 4 and 8). In order to maintain sufficient tension of the strip 82 the rear end thereof is provided with a plate 84 which is engaged by a tension screw 85. The screw 85 as shown by Figs. 4 and 5 extends through a bracket 86 and is adjusted relatively to the bracket by nuts 87. The bracket is affixed to the rear end of the bed 80 and the strip 82 is thus drawn tightly between the two ends of the bed. The bed is elevated to the position indicated by solid lines in Fig. 1 when the glasses 28 are in the forward position also shown by solid lines. The leather which is laid upon the strip 82 is engaged by the glasses 28 as the glasses move to the rear, the work being supported in this position by the toggle links 50 and 52 which are in their vertical position as indicated by the solid lines. During the operative stroke of the glasses 28 the leather is engaged in advance of the glasses by blades which exert sufficient tension upon the leather to eliminate the wrinkles and prevent the glasses from forming new wrinkles or folds. The embodiment of the invention includes a pair of complemental blades which are supported by the bed 80 and which move between the work and the bed. The carrier 29 is provided with coacting blades which engage the work above the aforesaid complemental blades and which clamp the work upon the under blades. The complemental blades which are supported by the bed are illustrated by Figs. 4, 6, and 7. These blades are indicated at 88, and project toward each other from opposite sides of the bed. In the form shown they are composed of relatively thin, flexible sheet metal, and are in the form of flat plates. Each of the blades 88 is mounted upon a slide or carriage 89 such as that illustrated by Fig. 10. The carriage is formed with a hollow boss 90 for the reception of a pivot stud 91 affixed to the blade. Each carriage or slide 89 is formed with grooves 92 for the reception of guide straps 93 (see Figs. 6 and 11). The guide straps are arranged upon opposite sides of the bed 80 and are here shown as supported in brackets or hangers 94 affixed to the bed. Each slide or carriage 89 is pivotally connected to the forward end of a link 95, the rear end of the links being pivotally connected to arms 96 carried by the carrier 29 (see Fig. 1). The movement of the carrier 29 is thus imparted to the slides or carriages 89 to reciprocate the latter upon their guide strips 93 and the pivotal connection afforded by the links 95 permits the rise and fall of the slides due to the movement of the bed.

Figures 9, 10, 11, 12:
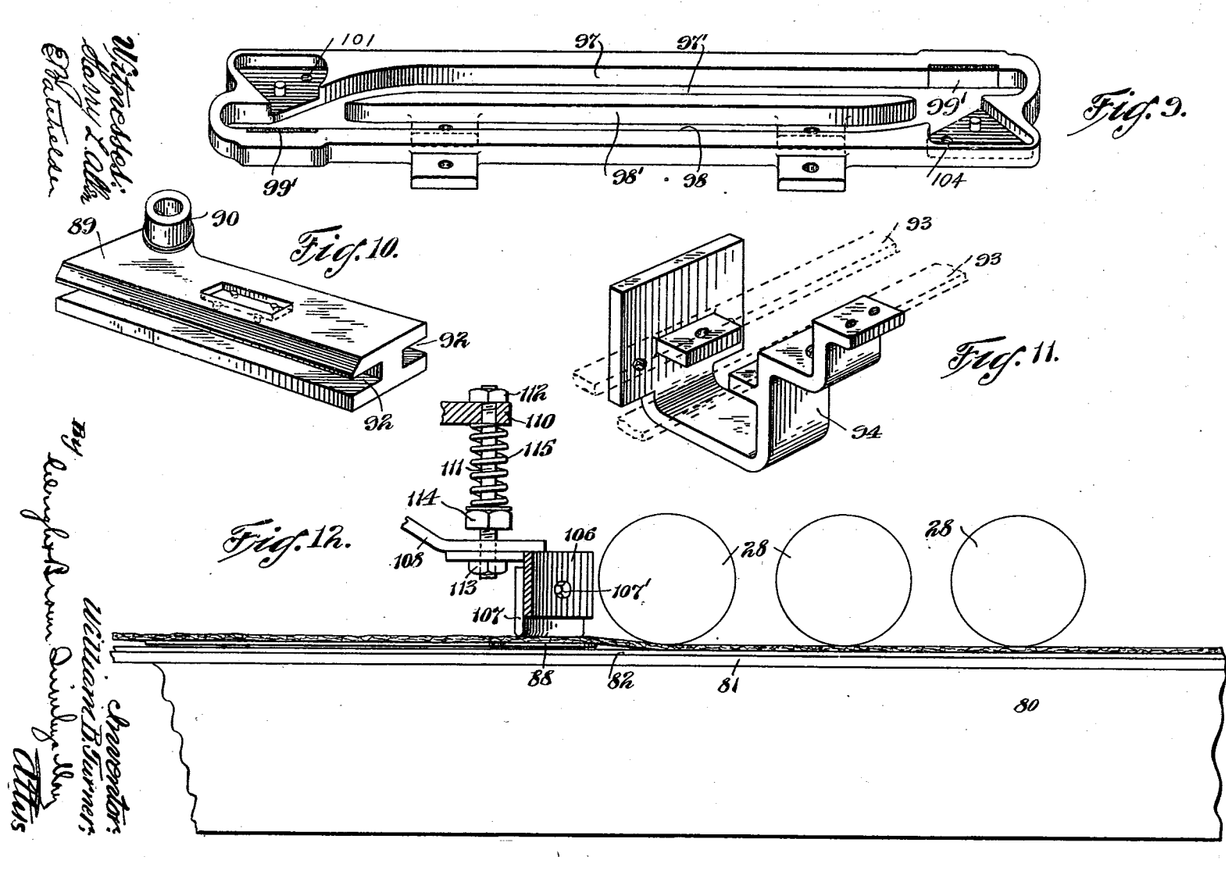
Fig. 9 represents a fixed guide which effects movement of one of the blades such as that illustrated by Fig. 7.
Fig. 10 represents in perspective a slide or carriage for said blade.
Fig. 11 represents in perspective a fragment of the supporting and guiding structure for the slide illustrated by Fig. 10.
Fig. 12 represents conventionally an edge view of the work upon its support, a plurality of glasses, and coacting blades acting upon the work in advance of the glasses, some parts being shown in section.

The blades 88 are oscillated about their pivots 91 so that in combination with their movement longitudinally of the bed they receive movement toward and from each other. When the blades are at the forward end of the bed they are moved toward each other so as to occupy the position indicated by solid lines in Fig. 4. In this position they engage the under surface of the work, and after being moved to the rear end of the bed they are turned about their pivots to the position indicated by dotted lines in Fig. 4. The blades are thus separated beyond the side edges of the strip 82 and in their separated relation they are moved again to the forward end of the bed before being again closed. For the purpose of imparting oscillatory motion to the blades stationary guides are provided. The guides are illustrated by Figs. 4 and 9, and they are supported by the hangers or brackets 94 which also support the guide strips 93. Each of said guides comprises a member including two strips having faces 97 and 98. Between the faces 97 and 98 is a strip having faces 97' and 98'.

The space between the faces 97 and 97' and the space between the faces 98 and 98' are sufficient to receive studs or projections 99 carried by the blades 88. The rear ends of the faces 97 and 97' are curved toward the faces 98 and 98' and the forward ends of the faces 98 and 98' are curved toward the faces 97 and 97'. The studs or projections 99 move between the faces 97 and 97' when the blades are moved to the rear and between the faces 98 and 98' when the blades move from the rear to the front. At the rear ends of the guides are arranged spring latches 100. The latches are pivoted upon studs 101 and are adapted to lie in the path of the studs 99. Each of the latches 100 is provided with a spring 102 the springs being affixed to the latches and arranged so that their free ends may engage suitable abutments whereby the latches may be normally positioned in the path of the studs 99.

At the forward end of each guide is a similar latch 103. The latches 103 are likewise mounted upon pivots which are indicated at 104 and are provided with springs 105 by which they are normally positioned in the path of the forward movement of the studs 99. The purpose of the latches 100 and 103 is to prevent the studs 99 from returning in the path of their preceding movement. The studs 99 in moving to the rear from the position shown by Fig. 4 engage the latches 100 and displace the latches against the tension of the springs 102. When the studs 99 have passed the latches 100 the latches spring back to their normal position as shown and prevent the studs 99 from returning between the faces 97 and 97'. The return movement of the studs 99 is therefore directed between the faces 98 and 98' and the blades 88 are thus maintained in open position during their return stroke.

The studs 99 in approaching their forward position engage and displace the latches 103 in the manner explained and these latches again resume their normal position in the path of the studs after the studs have passed by. In this way a four-way motion is imparted to each of the blades 88. Pieces 99' of resilient material such as leather are inserted in the guides to cushion the blows of the studs 99.

Figures 13, 14, 15, 16:
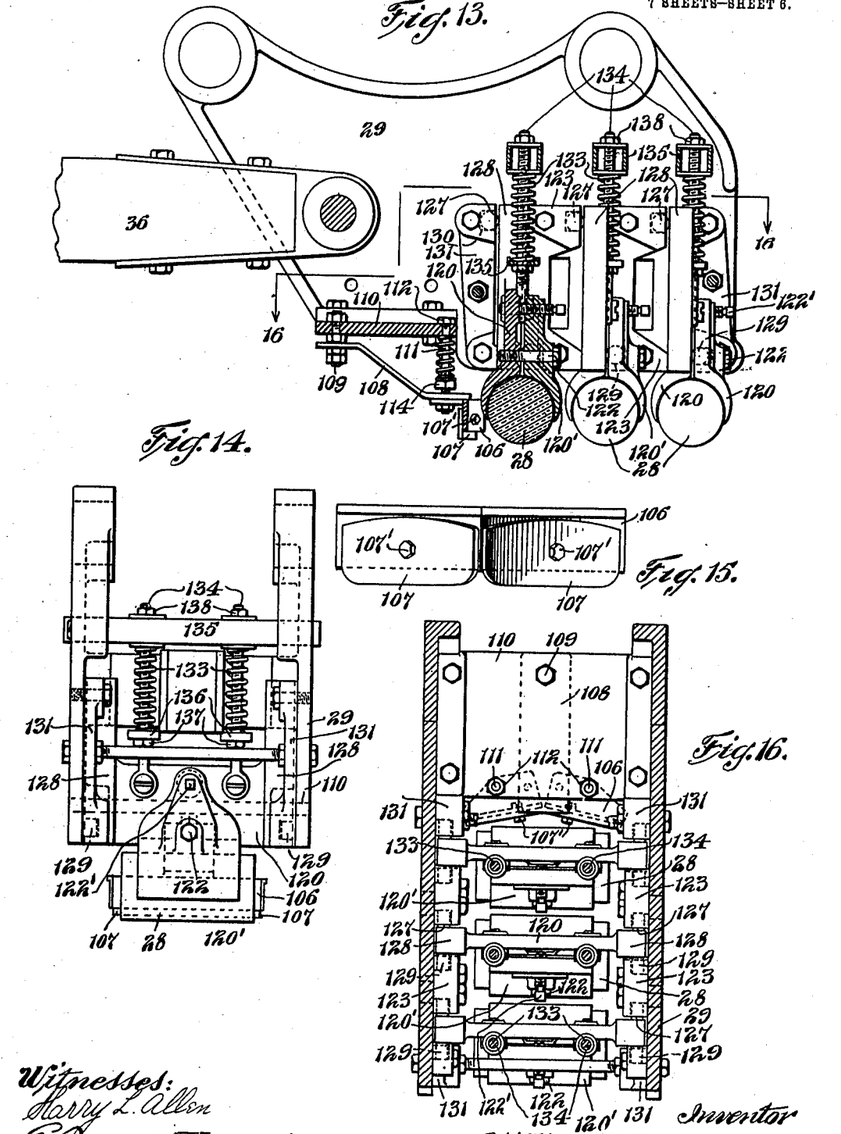
Fig. 13 represents a side elevation, partly in section, of a portion of the structure which supports and carries the glasses.
Fig. 14 represents a front elevation of the structure included in Fig. 13.
Fig. 15 represents a rear elevation of the upper blades.
Fig. 16 represents a section on line 16—16 of Fig. 13.

The coacting blades which engage the upper surface of the work and press the work against the blades 88 are illustrated by Figs. 1, 12, 13, 14, 15, and 16. The latter blades are indicated at 107 and are mounted on a base 106. The base as shown by Figs. 12 and 13 is affixed at the free end of a resilient arm 108. The arm 108 is attached by a bolt 109 to a cross-piece 110 of the carrier 29. Bolts 111 connect the base 106 to the cross-piece 110, said bolts being provided with nuts 112 and 113 which limit the downward movement of the base. The bolts are provided with nuts 114 and are surrounded by helical springs 115 compressed between the nuts 114 and the cross-piece 110. The tension of the springs 115 being exerted upon the nuts 114 tends to force the base 106 toward the work. The blades 107 are in the vertical plane of the work engaging portions of the blades 88 and the work is thus clamped with yielding tension between the blades 107 above and the blades 88 below as illustrated by Fig. 12. The blades 107 and 88 move in unison from front to rear and the blades 88 separate the work from the friction strip 82 so that the stretching of the work may not be impeded by said friction strip. As shown by Figs. 15 and 16 the blades 107 are inclined with relation to each other and the direction of movement in which the carrier 29 is reciprocated. The inclination of the blades is such as to stretch the leather laterally, one blade acting in opposition to the other in this respect. Each blade 107 is connected to the base 106 by a single stud 107', the stud serving as a pivot about which the blade may turn. The purpose of mounting the blades so that they may turn about their pivot studs is to enable them to equalize the clamping tension upon the work and to permit them to compensate for irregularities of the work or variation in the thickness thereof.

For the purpose of supporting the work on either side of the strip 82 the bed is provided with a frame including a cross-bar 116 at the forward end of the bed, bent strips 117 at the rear end of the bed and longitudinal side bars 118 connecting the front and rear pieces. Longitudinal strips 119 of relatively stiff leather or other material in the form of thin sheets are attached to the longitudinal bars 118 as shown by Fig. 6 and extend over the mechanism which opens and closes the blades 88. The inner edges of the strips 119 are preferably close to the vertical planes of the side edges of the strip 82. By means of the strip 119 the work is preserved in a substantially flat, horizontal condition and is prevented from engaging the blades 88 except in the space purposely provided between the inner edges of the strips 119.

It is desirable to mount the glasses 28 so that they may have a limited vertical movement with relation to their carrier 29 and that the relative movement shall be yielding. It is also desirable that the glasses be mounted in such a way that the friction of the relative movement shall be reduced to a minimum. For this reason the glasses are mounted in the manner illustrated by Figs. 13, 14, and 16. The shape of the glasses illustrated is cylindrical. Each glass is clamped between a pair of jaws 120 and 120', the jaws being forced together by bolts 122 and 122'. Each jaw 120 is provided with vertical end pieces 128, and each end piece 128 is provided with roller bearings. The rollers upon which the pieces 128 bear are indicated respectively at 127 and 129, the rollers 127 being at the upper ends and engaging the rear of the pieces 128 and the rollers 129 being at the lower ends and engaging the front faces of the pieces 128. The rollers 127 are contained in recesses 124 formed in bearing blocks 123 affixed to the sides of the carrier 29. The rollers 129 are contained in recesses 130 formed in the lower ends of the blocks 123. The recesses 130 for the lower rolls 129 of the rear glass 28 are formed in blocks 131 which differ from the blocks 123 in form only, the blocks 131 being provided for one roll each whereas the blocks 123 are provided for two rolls each for adjacent end pieces 128. The recesses 124 are provided with vertical portions 125 upon which the rolls 127 may roll, the space between the upper and lower walls of the recesses 124 being greater than the diameter of the rolls so that the rolls may move vertically in the recesses without friction. The space between the upper and lower walls of the recesses 130 is likewise greater than the diameter of the rolls 129 and the recesses 130 are also formed with vertical walls 132 upon which the rolls 129 may roll without friction.

Each pair of jaws is normally depressed by springs 133, the springs being here shown upon rods or plungers 134 attached to the jaws 120 and extending through cross-bars 135. The springs are compressed between the cross-bars and washers 136 adjustably supported upon the plungers 134 by nuts 137.

The roller bearings for the several pairs of jaws are so arranged that they receive the horizontal pressure due to the resistance of the work when the glasses are moved from front to rear, and the glasses are therefore adapted to rise and fall upon their respective rollers as the thickness of the work encountered varies. The upper end of each plunger 134 is screw threaded and is provided with a nut 138 by which the initial horizontal plane of the glasses may be determined. The glasses are so adjusted as to be slightly raised by the work against the tension of their springs 133 when the work is supported in operative position.

Having thus explained the nature of my said invention and described a way of constructing and using the same, although without attempting to set forth all of the forms in which it may be made or all of the modes of its use, what I claim is:—

1. A glazing machine comprising a reciprocatory carrier, glazing means mounted on the carrier, and means for engaging and stretching the work in advance of the glazing means.

2. A glazing machine comprising a reciprocatory carrier, glazing means mounted on the carrier, and means movable with the carrier for engaging and stretching the work in advance of the glazing means.

3. A glazing machine comprising a reciprocatory carrier, glazing means mounted on the carrier, and movable means for engaging and stretching the work longitudinally and laterally in advance of the glazing means.

4. A glazing machine comprising a reciprocatory carrier, glazing means mounted on the carrier, and means movable in advance of the glazing means for clamping the work with yielding tension.

5. A glazing machine comprising a reciprocatory carrier, glazing means mounted on the carrier, and coacting clamping members movable in advance of the glazing means for engaging both sides of the work.

6. A glazing machine comprising a reciprocatory carrier, glazing means mounted on the carrier, and clamping means for engaging both sides of the work in advance of the glazing means, said clamping means being connected to and reciprocated by the carrier.

7. A glazing machine comprising a bed for the work, means for supporting the work on both sides of the bed, glazing means arranged to move along said bed between said side supporting means, a blade arranged to move along said bed in advance of said glazing means to engage the upper surface of the work, and means arranged to move along said bed under the work in coactive relation to said blade.

8. A glazing machine comprising a bed for the work, glazing means movable along the bed, means movable along the bed in advance of and parallel to the glazing means for engaging the upper surface of the work, and means for engaging the under surface of the work in coactive relation to said upper work-engaging means, said under work-engaging means being movable along the bed with said upper work-engaging means, and being also movable transversely to and from coactive relation with said upper work-engaging means.

9. A glazing machine comprising a bed for the work, glazing means movable along the bed, means movable along the bed in advance of and parallel to the glazing means for engaging the upper surface of the work, means for engaging the under surface of the work in coactive relation to said upper work-engaging means, said under work-engaging means being movable along the bed with said upper work-engaging means, and being also movable transversely to and from coactive relation with said upper work-engaging means, and means for supporting the work at the sides of the bed above the plane of said transversely movable means.

10. A glazing machine comprising a bed for the work, separate work supporting strips extending longitudinally of the bed slightly above the plane of the bed, glazing means movable along the bed between said strips, means movable along the bed between said strips in advance of the glazing means for engaging the upper surface of the work, and means for engaging the under surface of the work in coactive relation with said upper work-engaging means, said under work-engaging means being movable along the bed in unison with said upper work-engaging means, and being also movable transversely from coactive relation with said upper work-engaging means to a position beneath said strips.

11. A glazing machine comprising a bed for the work, glazing means movable along the bed, means movable along the bed in advance of and parallel to the glazing means for engaging the upper surface of the work, and a pair of complemental blades for engaging the under surface of the work in coactive relation to said upper work-engaging means, said blades being movable along the bed with said upper work-engaging means, and being also movable toward and from each other transversely of the bed.

12. A glazing machine comprising a bed for the work, glazing means movable along the bed, means movable along the bed in advance of the glazing means, said means engaging the under surface of the work, and a plurality of blades movable with said under work-engaging means and arranged to engage the upper surface of the work in coactive relation with said under work-engaging means, said blades being arranged at angles to their direction of movement.

13. A glazing machine comprising a bed for the work, glazing means movable along the bed, and a plurality of pivotally mounted blades movable in advance of said glazing means for engaging the work, each of said blades being independently movable about its pivot.

14. A glazing machine comprising reciprocatory glazing means, a bed movable toward and from the glazing means, means movable with the glazing means for engaging the upper surface of the work in advance of the glazing means, and means supported by the bed for engaging the lower surface of the work in coactive relation with said upper work-engaging means, said lower work-engaging means being movable with said upper work-engaging means along the bed.

15. A glazing machine comprising a carrier, glazing means mounted thereon, a bed movable toward and from the glazing means, a blade mounted on said carrier to engage the upper surface of the work in advance of said glazing means, a blade movably supported by the bed to engage the lower surface of the work in coactive relation with said upper blade, and means connecting said carrier and said lower blade for moving said lower blade along the bed with said upper blade.

16. A glazing machine comprising a carrier, a bed for the work, a glazing tool, a holder for said tool, and rolling members interposed between said carrier and said holder upon which said holder is adapted to roll toward and from said bed.

17. A leather-working machine comprising a bed for the work, a reciprocating working tool movable along the bed, work-engaging blades movable along one side of the work in advance of the tool, and plates movable in coactive relation with said blades, but upon the opposite side of the work, said blades and plates being arranged and moved to smooth and stretch the work.

18. A leather-working machine comprising a bed for the work, a reciprocating working tool movable along the bed, a thin flat plate movable between the work and the bed and in advance of the tool, said plate being arranged with its flat sides parallel to the bed and work, and a blade arranged to present an edge to the opposite side of the work in coactive relation with said plate, said blade being movable with said plate.

19. A leather-working machine comprising a bed for the work, a reciprocating working tool movable along the bed, a thin flat plate movable between the work and the bed in advance of the tool, means for moving said plate transversely away from the path of said tool at the finish of the working stroke thereof, and into the path of the tool at the end of the return stroke of the tool, and a blade arranged to engage the other side of the work in coactive relation with said plate, said blade being movable with said plate in advance of the tool.

20. A leather-working machine comprising a bed for the work, a reciprocatory working tool movable along the bed, thin flat plates movable laterally of the bed and from each other between the work and the bed, said plates being arranged in advance of the tool and on opposite sides of the path of the tool, means for engaging the opposite side of the work in coactive relation with said plates, means for reciprocating said plates and coactive means in lines parallel to the path of the tool and in advance of the tool, and means for separating said plates laterally at the end of the working stroke of the tool and for closing them at the end of the return stroke of the tool.

In testimony whereof I have affixed my signature, in presence of two witnesses.

WILLIAM B. TURNER.

Witnesses:
W. P. ABELL,
P. W. PEZZETTI.